(12) United States Patent
Thompson et al.

(10) Patent No.: US 8,799,423 B2
(45) Date of Patent: Aug. 5, 2014

(54) SYSTEM AND METHOD FOR OPTIMIZING AND DIGITALLY CORRECTING ERRORS ON A COMPUTER SYSTEM

(75) Inventors: Robert Thompson, Brooklyn, NY (US); Michael Duffey, San Antonio, TX (US); Wei Sun, Brooklyn, NY (US); Joey J. Bursky, New York, NY (US)

(73) Assignee: Consumer Software International, Inc., New York, NY (US)

( * ) Notice: Subject to any disclaimer, the term of this patent is extended or adjusted under 35 U.S.C. 154(b) by 262 days.

(21) Appl. No.: 13/384,530

(22) PCT Filed: Jul. 15, 2010

(86) PCT No.: PCT/US2010/042105
§ 371 (c)(1),
(2), (4) Date: Apr. 5, 2012

(87) PCT Pub. No.: WO2011/008933
PCT Pub. Date: Jan. 20, 2011

(65) Prior Publication Data
US 2012/0191968 A1   Jul. 26, 2012

Related U.S. Application Data

(60) Provisional application No. 61/225,869, filed on Jul. 15, 2009.

(51) Int. Cl.
*G06F 15/177* (2006.01)
(52) U.S. Cl.
USPC ........................................................ 709/220
(58) Field of Classification Search
CPC ................................................... G06F 15/177

USPC .......... 709/220, 221, 222, 223, 226; 370/351; 713/100
See application file for complete search history.

(56) References Cited

U.S. PATENT DOCUMENTS

| | | | |
|---|---|---|---|
| 5,822,565 A | 10/1998 | Derosa, Jr. et al. | |
| 6,059,842 A | 5/2000 | Dumarot et al. | |
| 6,963,908 B1 * | 11/2005 | Lynch et al. | 709/220 |
| 2006/0190714 A1 * | 8/2006 | Vaszary et al. | 713/100 |

OTHER PUBLICATIONS

Nallawalla, Ash, "First Aid 95 Deluxe", PC Update, Nov. 1996.
International Search Report issued on Sep. 30, 2010 in International Appln. No. PCT/US2010/042105.

* cited by examiner

*Primary Examiner* — Frantz Jean
(74) *Attorney, Agent, or Firm* — Stroock & Stroock & Lavan LLP

(57) ABSTRACT

A method for optimizing a computer system, the method comprising the steps of receiving at least one key corresponding to at least one attribute of at least one configurable computer system; accessing an electronic key database stored in a memory that includes computer configuration information; comparing the received keys with entries in the key database; generating recommendations where the recommendations include commands selected from the group consisting of deleting, Disabling, suspending, changing process priority, and delaying the execution of the attribute corresponding to the key received from the configurable computer system; and transmitting the recommendations to the configurable computer system based upon the comparison of the received keys with entries in the key database.

20 Claims, 4 Drawing Sheets

SYSTEM AND METHOD FOR OPTIMIZING AND DIGITALLY CORRECTING ERRORS ON A COMPUTER SYSTEM

CROSS-REFERENCE TO RELATED APPLICATIONS

This application is a National Phase of PCT International Application No. PCT/US2010/042105, filed Jul. 15, 2010, designating the United States, and published on Jan. 20, 2011 as WO 2011/008933 A1, which application claims priority under 35 U.S.C. §119(e) to U.S. Provisional Application No. 61/225,869, filed Jul. 15, 2009. The disclosures of these prior applications are hereby incorporated by reference in their entireties and should be considered part of this specification.

FIELD OF THE INVENTION

Embodiments of the present invention are related to systems and methods for correcting errors and optimization of computer systems and, in particular, to a client module operative on a computer system that includes scanning technology to determine and hold defining characteristics for settings, programs, and system resources and retrieve recommended modifications and actions to perform correction and optimization of the computer system based on said settings, programs, and system resources.

BACKGROUND OF THE INVENTION

Typical computer system cleaning/error correction and optimization technologies clean or modify a client computer using a static, hard-coded set of rules. In this way, a particular computer user's usage habits or patterns and specific needs cannot be addressed. Such one-size fits all approaches, thus, fail to provide a customized optimization and cleaning/error correction solution to individual or group computer users.

Thus, there is a need in the art for a dynamic cleaning engine that can analyze and produce a dynamic, analysis and provide recommended modifications and a list of actions to be performed on the user's computer to provide customized optimization and cleaning/error correction.

SUMMARY OF THE INVENTION

Embodiments of the present invention relate generally to the retrieval of defined characteristics for settings, programs, and system resources in order to optimize and clean a computer, such as a personal computer, to increase the speed and efficiency at which the personal computer starts and operates.

In one such embodiment, a client module is programmed to examine or scan a file's name, size, or byte signature and then create a defining characteristics key (DCK) for each file based on such afore-mentioned information, which may include the extraction of additional information (as further described below). The extracted information may then be combined into a unique DCK entry in a remote database that can then be identified by a global identification number from any client computer.

This information is then preferably communicated between a client computer and server via a network, such as the Internet. Typical system cleaning/error correction and optimization technologies clean or modify a client computer using a static, hard-coded set of rules. In contrast, the dynamic cleaning engine of the present invention sends data from the client computer to a server via the internet and retrieves a dynamic analysis and recommended modifications and list of actions to be performed on the client's computer. In operation, this exchange preferably passes a data array of DCK entries to a remote server and receives a data array of results in return. These results preferably reflect an analysis of submitted DCK's and contain individual recommendations for the modification or actions to be performed on each DCK (such as changing a setting, deleting or disabling a file, or delaying a process or application).

In addition, embodiments of the invention relate to the detection and modification of system settings. Typically, a user must manually review and change settings using tools provided by the system. In contrast, embodiments of the present invention use detection technology to review settings and configuration files as embodied in the client module. Accordingly, in a preferred embodiment, the client module performs an analysis of a user's computer and creates the DCK array, which is then transmitted to the remote server for analysis. The remote server being programmed with an analysis module creates a recommendation set, which is then transmitted back to the user's computer.

The client module is preferably programmed to receive the recommendation set and act upon such recommendations. Specifically, in a preferred embodiment, the client module then compares these settings and configurations to the set of recommended settings and configurations based on system type and configuration. After analyzing the current settings against recommendations and system configuration, the client module can then change all settings and configurations to match the recommended settings.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE FIGURES

FIG. 4 is a schematic depicting a high level process flow for optimizer detection and modification of system settings a high level process flow of.

DETAILED DESCRIPTION

Figure 1:
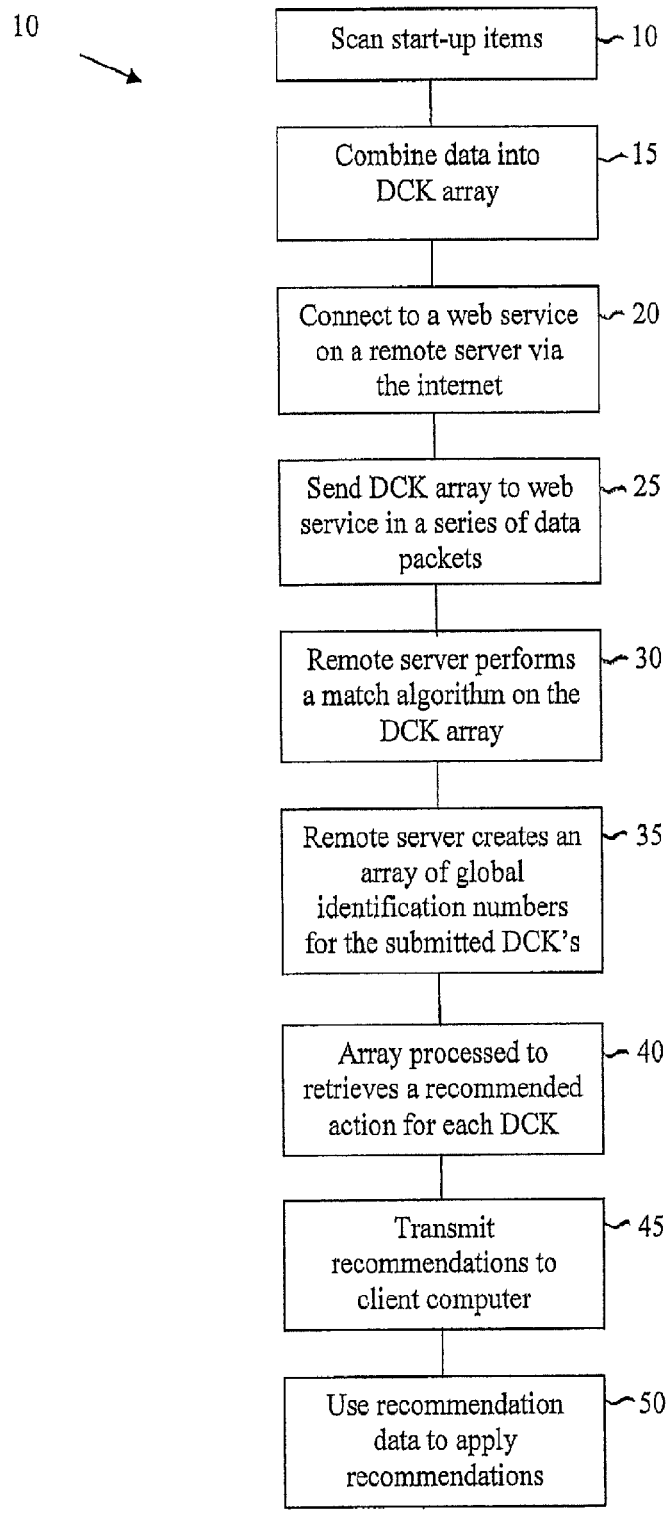
FIG. 1 is a flow diagram depicting high level processes in accordance with an embodiment of the present invention.

Embodiments of the invention are generally related to computer cleaning/error correction and optimization.

As used in this application, the terms "cleaning" or "error correction" includes, but is not limited to, the detection of and fixing of errors or bugs such as, for example, registry errors, invalid entries, missing file references or broken links within the registry and/or other areas of a computer system or its operating system and other programs.

As used in this application, the term "optimization" includes, but is not limited to, the modification of computer system settings to increase speed and efficiency of computer operations, such as, for example, computer start-up or boot, and to reduce latency in other computer operations.

A computer system in accordance with an embodiment of the invention is comprised of a centralized server system, including, but not limited to a server computer and a storage device operative with a database management system. The system is capable of communication with a plurality of client computers. Each client computer has preferably received, installed and is operative with a client module programmed to perform the analysis functions described herein. Such client module may be an applet, thin client, ActiveX control or other form of program operative on a client computer. It will be understood, however, by a person of ordinary skill in the art that such client module may be replaced by other methods of controlling operations on a client system now known or heretofore developed.

More specifically, in a preferred embodiment, the client module is preferably comprised of three unique technologies/programming modules: 1) a scanning and detection technology/programming module that creates a unique defining characteristics key (DCK) for certain settings, programs, active processes, services, and system resources; 2) programming to store DCK's in an array which is communicated to a remote server via a network, such as the internet, which preferably is further programmed to process the DCK array and return an array of recommendations, modifications, and actions to be performed on the DCK's base objects; and 3) a technology/programming module to review settings and configuration files to a set of recommended settings and configurations, such that, after the comparison process, this technology can change all existing configurations and settings to match the recommended set.

DCK entries preferably combine file name, size in bytes, file type, version number, publishing company, digital signature, location on client computer, number of active threads, memory set, machine name, number of handles, kernel mode time, user mode time, number of memory paging faults, process priority, I/O read count, I/O transfer count, creation date, windows version, and unique byte signatures into one DCK entry.

It should be noted that although the embodiments described herein may be used in connection with one server and one related database for performing the various functions of the system, other embodiments could be implemented by storing the software or programming that operates the described functions on any combination of multiple servers and databases as a matter of design choice so long as the functionality described herein is performed.

Various servers and other computer systems described herein include such art recognized components as are ordinarily found in server systems, including but not limited to processors, RAM, ROM, clocks, hardware drivers, associated storage, and the like. One skilled in the art will recognize, however, that because multiple users may be accessing such server at any given time it may become preferable to utilize multiple servers and databases, which may be used separately or in tandem to support the systems' traffic and processing, such as, by way of non-limiting example, a round-robin configuration utilizing multiple server systems. Client computers can be personal computers including at least a network adapter and web browsing capability, but may also include handheld devices such as PDAs, mobile smart phones (e.g., Blackberry®, iPhone®, Treo®, Droid® and the like), or other wireless devices. Furthermore, in certain embodiments, user computers can be network systems having components such as servers, databases, etc.

In a preferred embodiment, centralized computer system is programmed with computer program code comprising a plurality of programming modules and subcomponents. It should be noted that although the embodiments described may use multiple software modules for performing the various functions of the system, other embodiments could be implemented using any number of modules, with any single module incorporating the functions of several, or all, of the modules. The precise design of the software and the programming language used may be designed differently within the scope of the present invention. The software modules can be created using art recognized programming languages, including but not limited to ASP, Java, C#, ASP.NET, or PHP or any combination of known programming languages that allow the functionality described.

It will also be understood that, although the various embodiments of the present invention described herein are being described in terms of web-based centralized server architecture, a thin client, fat-client, or peer-to-peer type arrangement could be substituted for the system architecture described herein and are within the scope of the present invention. Additionally, the programming described herein can be stored in a machine readable form on a computer readable medium, such as a CD-ROM or DVD, and distributed to users for installation on user computers. Alternatively, such programming can be downloaded via a network. In either embodiment, communication with the system may be effected across known networks, such as the Internet.

The client module that detects and modifies these settings can also be updated with changes in detection technology and modification recommendations via an Internet notification technology instructing the module to replace itself with an updated version.

1. Scanning and Detection Technology

Embodiments of the invention include a process which scans a set of settings, programs, system resources, active processes, services, DLL's, and system files.

Specifically, with reference to the flow diagram 100 of FIG. 1, in a preferred embodiment designed to optimize the start-up or reboot of a computer, this process scans startup items (both registry entries and shortcut links), system services, active processes, and browser add-ons (including toolbars, browser helper objects, ActiveX controls, and extensions) (step 10). Each item is preferably scanned for several characteristics. These characteristics may include, but are not necessarily limited to, name, size in bytes, file type, version number, publishing company, digital signature, location on client computer, number of active threads, memory set, machine name, number of handles, kernel mode time, user mode time, number of memory paging faults, process priority, I/O read count, I/O transfer count, creation date, windows version, and unique byte signatures. Together, in step 15, the characteristics included are combined into a unique DCK (defining characteristic key) and are held in an array. It is preferred that a single DCK is used, but multiple DCK's may also be employed according to a desired design criteria.

2. DCK Communication and Recommendation Technology

Embodiments of the invention include a process by which the said DCK array is communicated to a remote server in exchange for a set of recommendations, modifications, and actions to be performed on the DCK base objects.

With reference back to FIG. 1, once the scanning and detection process has created the DCK array, a communication process preferably connects to a web service on a remote server via the internet (step 20). The communication process preferably sends the DCK array to the web service in a series of data packets (step 25). In step 30, the remote server then performs a match algorithm on the DCK array. In a preferred embodiment, this match algorithm operates to add new unique DCK's to the master DCK database, while existing DCK's are matched to a global identification number. The remote server then preferably creates an array of global identification numbers for the submitted DCK's (step 35). This array is processed by the recommendation engine, which retrieves a recommended action for each DCK, in step 40. This final array of global identification numbers and recommendations is then transmitted back to the client, in step 45. The client module then preferably uses the recommendation data to apply the recommendations to the DCK base objects, in step 50. The recommendations allow the DCK base objects to be altered, modified, and have actions performed upon them. For instance, a DCK base object could be altered, deleted, disabled (temporarily moved to a disabled location), suspended, have its process priority changed, have its settings modified, or be delayed (whereby the module disables an item and then enables it at a later, delayed time).

Some DCK base objects may be actively running on client computers. For these DCK objects, in a preferred embodiment, multiple DCK samples are performed to create performance monitoring data. By aggregating multiple DCK samples for both individual machines and multiple machines, performance statistics and information is created. This performance information may be data mined to remove noise and normalize results into a set of reasonable data. This reasonable data is then analyzed by classification algorithms to group DCK's into performance clusters. These performance clusters inform the recommendation engine to be able to apply recommendations onto individual DCK's. Classification algorithms used include support vector machine methods and principal component analysis procedures to analyze DCK metrics and statistics.

3. Detection and Modification of Settings

Embodiments of the invention include a detection process that extracts data from system settings and configuration files and stores the results in an array. This array is then matched against an array of recommendations based on the system configuration. Any settings and configurations that do not match the recommendation for the system can then be updated to match the recommendation by the process. Settings and configurations analyzed include paging file settings, indexing services settings, network and printer settings, energy saving settings, menu settings, file compression settings, remote task settings, window display settings, animation settings, refresh rate settings, special effects settings, icon cache settings, multiple independent processes for desktop and explorer, information recording settings, interface restart settings, and others. The module that detects and modifies these settings can also be updated with changes in detection technology and modification recommendations via an internet notification technology instructing the module to replace itself with an updated version.

Figure 2:
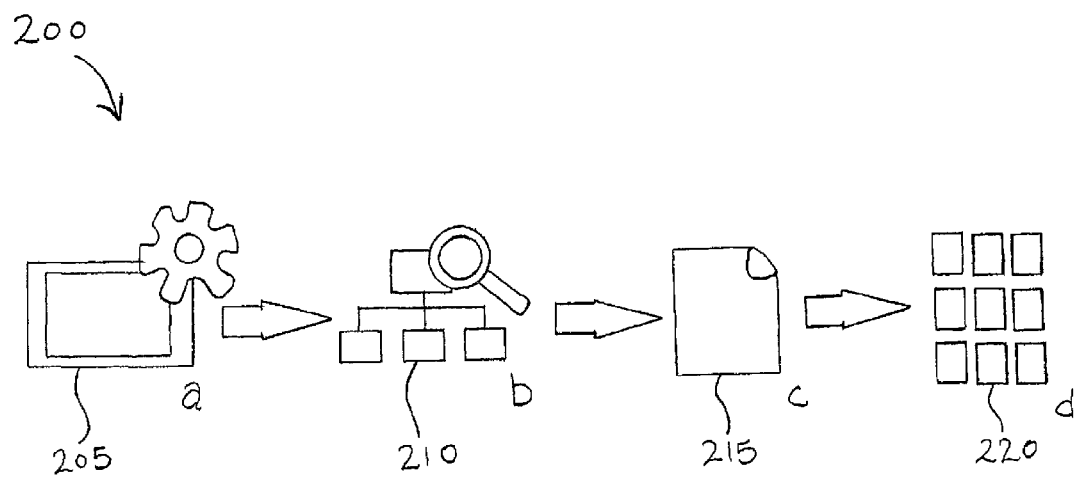
FIG. 2 is a schematic depicting a scanning operation causing the creation of an illustrative DCK array in accordance with an embodiment of the present invention.

With reference to FIG. 2, an embodiment of the scanning and creation of a DCK Array is shown and will be described. As depicted in FIG. 2, a series of processes 200 operate to create a DCK array:

a. Module runs scanning process on client system (205);

b. Scanning process scans startup items, system services, and browser add-ons for several characteristics (210);

c. Unique characteristics of each item scanned create a DCK (defining characteristics key) for each item, combining name, size in bytes, file type, version number, publishing company, digital signature, location on client computer, and unique byte signatures into a unique key (215); and d. All DCK's are stored in an array for use by the module (220).

Figure 3:
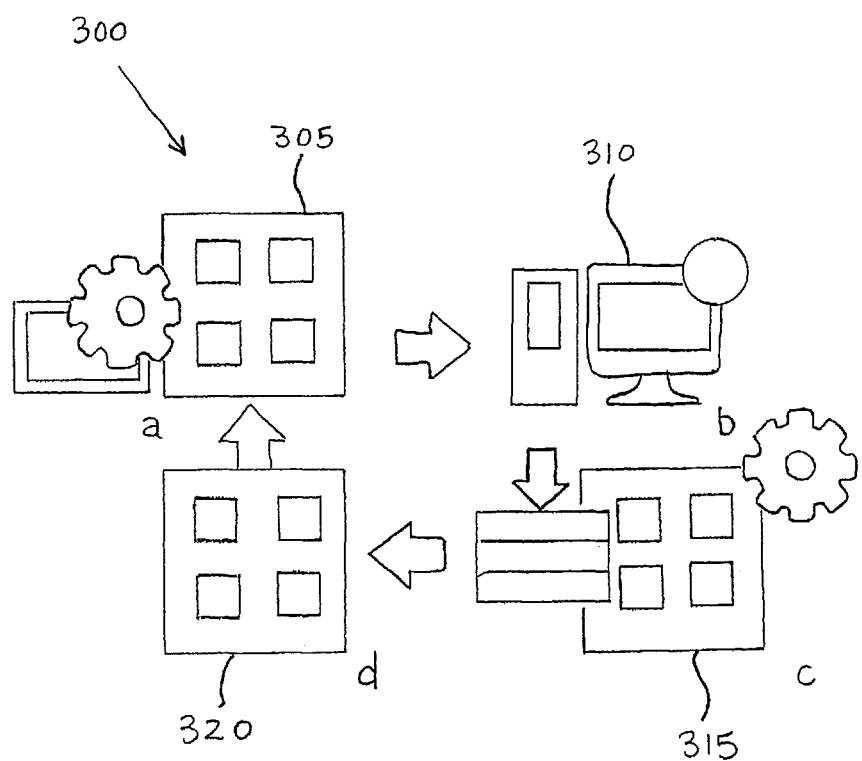
FIG. 3 is a schematic depicting a high level process flow of communicating a DCK array and causing a set of recommendations to be transmitted back to a client system in accordance with an embodiment of the present invention.

With reference to FIG. 3, an embodiment of the DCK Communication and Recommendation Process is shown and will be described. As depicted in FIG. 3, the following illustrative processes 300 may be used:

a. Module runs on client computer and prepares DCK array (305);

b. DCK array is sent via the internet to a remote server using a web service (310);

c. Web service processes each DCK and matches it against and existing DCK in the database or creates a new DCK. The process then returns a global identification number and recommendation for each DCK (315); and d. The completed array of DCK recommendations and global identifiers is returned to the client computer via the internet (320).

Figure 4:
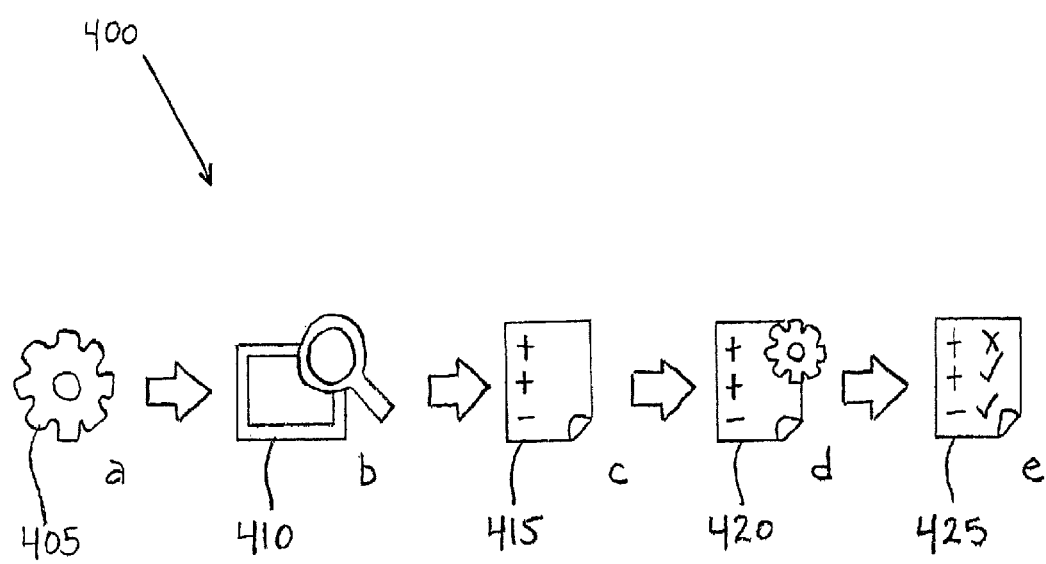

With reference to FIG. 4, an embodiment of an Optimizer Detection and Optimization of System Settings is shown and will be described. As depicted in FIG. 4, a series of processes 400 preferably runs as follows:

a. Module runs on client computer (405);

b. Module scans settings and system configuration files (410);

c. Scan results in an array of system settings and configuration data (415);

d. Module processes array against recommended settings and configuration data for the system (420); and e. Module outputs recommended settings and effects any desired changes on the client computer's settings and configuration files (425).

It should be noted that references herein to phrases such as "one embodiment" or "an embodiment" means that a particular feature, structure or characteristic described in connection with the embodiment is included in at least one embodiment of the invention. The phrases such as "in one embodiment" or "in certain embodiments" in various places in the specification are not necessarily, but can be, referring to the same embodiment. Use of the term "preferred" or "preferably" is intended to indicate a configuration, set-up, feature, process, or alternative that may be perceived by the inventor(s) hereof, as of the filing date, to constitute the best, or at least a better, alternative to other such configurations, set-ups, features, processes, or alternatives. In no way shall the use of the term "preferred" or "preferably" be deemed to limit the scope of the claims hereof to any particular configuration, set-up, feature, process, or alternative.

It will be further appreciated by those skilled in the art that the figures are purely illustrative, and that the system may be implemented in any number of ways, by the actual designers, as long as the functionality, relating to the optimization and cleaning of a computer through a system that assists in recommending settings based on information received from the client computer, stays intact.

While there have been shown and described fundamental novel features of the invention as applied to the exemplary embodiments thereof, it will be understood that omissions and substitutions and changes in the form and details of the disclosed invention may be made by those skilled in the art without departing from the spirit of the invention.

What is claimed is:

1. A method for optimizing a computer system, the method comprising the steps of:

receiving, from at least one configurable computer system, at least one key corresponding to at least one attribute of the at least one configurable computer system;

accessing an electronic key database stored in a memory that includes computer configuration information;

comparing the received keys with entries in the key database;

generating recommendations based upon the comparison of the received keys with entries in the key database, where the recommendations are commands selected from the group consisting of altering, deleting, disabling, suspending, changing process priority of, and delaying the execution of the attribute corresponding to the key received from the at least one configurable computer system; and transmitting the recommendations to the at least one configurable computer system for execution by the at least one configurable computer system, thereby affecting the attribute of the at least one configurable computer system.

2. The method of claim 1, further comprising the step of receiving performance data collected from the configurable computer system.

3. The method of claim 2, wherein the recommendations are generated by a recommendation engine.

4. The method of claim 3, further comprising the steps of:
analyzing the performance data using an algorithm; and
modifying the recommendation engine based on the analysis of the performance data.

5. The method of claim 1, wherein the attribute is selected from the group consisting of a software setting, a hardware setting, a program, an active process, a system resource, and a service.

6. The method of claim 1, wherein the keys received from the configurable computer systems are received through the internet and the keys are arranged in a key array.

7. The method of claim 1, wherein the transmitted recommendations are arranged in an array.

8. The method of claim 5, wherein the key array is unique for each configurable computer system.

9. The method of claim 1, wherein the method is performed by a server and the configurable computer system is a personal computing device.

10. The method of claim 1, further comprising the steps of:
receiving keys corresponding to multiple configurable computer systems; and
including entries derived from keys corresponding to multiple configurable computer systems in the key database.

11. A non-transient computer readable medium containing computer code, the computer code comprising computer code configured to cause a computer to:
receive, from at least one configurable computer system, at least one key corresponding to at least one attribute of the at least one configurable computer system;
access an electronic key database stored in a memory that includes computer configuration information;
compare the received keys with entries in the key database;
generate recommendations based upon the comparison of the received keys with entries in the key database, where the recommendations are commands selected from the group consisting of altering, deleting, disabling, suspending, changing process priority of, and delaying the execution of the attribute corresponding to the key received from the at least one configurable computer system; and
transmit the recommendations to the at least one configurable computer system for execution by the at least one configurable computer system, thereby affecting the attribute of the at least one configurable computer system.

12. The non-transient computer readable medium of claim 11, wherein the computer code is further configured to cause a computer to select the attribute from the group consisting of a software setting, a hardware setting, a program, an active process, a system resource, and a service.

13. The non-transient computer readable medium of claim 11, wherein the computer code is further configured to cause a computer to:
receive keys corresponding to multiple configurable computer systems; and
include entries derived from keys corresponding to multiple configurable computer systems in the key database.

14. The non-transient computer readable medium of claim 11, wherein
the computer code to cause a computer to generate recommendations comprises a recommendation engine; and
the computer code further comprises computer code configured to cause a computer to receive performance data collected from the configurable computer system.

15. The non-transient computer readable medium of claim 14, wherein the computer code further comprises code configured to cause a computer to:
analyze the performance data using an algorithm; and
modify the recommendation engine based on the analysis of the performance data.

16. A computer system comprising:
a communication device;
a memory; and
a processor configured to,
receive, from at least one configurable computer system, at least one key corresponding to at least one attribute of the at least one configurable computer system;
access an electronic key database stored in a memory that includes computer configuration information;
compare the received keys with entries in the key database;
generate recommendations based upon the comparison of the received keys with entries in the key database, where the recommendations are commands selected from the group consisting of altering, deleting, disabling, suspending, changing process priority of, and delaying the execution of the attribute corresponding to the key received from the at least one configurable computer system; and
transmit the recommendations to the at least one configurable computer system for execution by the at least one configurable computer system, thereby affecting the attribute of the at least one configurable computer system.

17. The computer system of claim 16, wherein the processor is further configured to:
receive keys corresponding to multiple configurable computer systems; and
include entries derived from keys corresponding to multiple configurable computer systems in the key database.

18. The computer system of claim 17, wherein the memory includes a recommendation engine module and the processor is configured to generate recommendations via the recommendation engine module.

19. The computer system of claim 18, wherein the memory includes a performance analyzing module that utilizes an algorithm and the processor is further configured to:
receive via the communication device performance data collected from the configurable computer system;
analyze the performance data using a performance analyzing module; and modify the recommendations derived from the recommendation engine module based on the results derived from the performance analyzing module.

20. The computer system of claim 16 wherein the computer system is a server and the communication device is a modem.

\* \* \* \* \*